(12) United States Patent
Liang et al.

(10) Patent No.: US 7,739,623 B2
(45) Date of Patent: Jun. 15, 2010

(54) INTERACTIVE 3D DATA EDITING VIA 2D GRAPHICAL DRAWING TOOLS

(75) Inventors: Cheng-Chung Liang, West Windsor, NJ (US); Jian-Zhong Qian, Princeton Junction, NJ (US); Guo-Qing Wei, Plainsboro, NJ (US); Li Fan, Belle Mead, NJ (US); Xiaolan Zeng, Princeton, NJ (US)

(73) Assignee: Edda Technology, Inc., Princeton Junction, NJ (US)

( * ) Notice: Subject to any disclaimer, the term of this patent is extended or adjusted under 35 U.S.C. 154(b) by 1431 days.

(21) Appl. No.: 11/106,130

(22) Filed: Apr. 14, 2005

(65) Prior Publication Data

US 2005/0231530 A1    Oct. 20, 2005

Related U.S. Application Data

(60) Provisional application No. 60/562,261, filed on Apr. 15, 2004.

(51) Int. Cl.
*G06F 17/00* (2006.01)
(52) U.S. Cl. .................. 715/848; 715/852; 715/757; 715/782; 382/128; 382/285; 382/173
(58) Field of Classification Search .......... 715/757, 715/782, 852, 848; 382/154, 285, 164, 128, 382/173
See application file for complete search history.

(56) References Cited

U.S. PATENT DOCUMENTS

| | | | | |
|---|---|---|---|---|
| 6,091,422 A * | 7/2000 | Ouaknine et al. | ........... | 345/419 |
| 6,468,218 B1 * | 10/2002 | Chen et al. | .................. | 600/443 |
| 6,593,926 B1 * | 7/2003 | Yamaguchi et al. | ......... | 345/427 |
| 7,009,611 B2 * | 3/2006 | Di Lelle | ..................... | 345/467 |
| 7,561,725 B2 * | 7/2009 | Liang | .......................... | 382/128 |
| 7,626,589 B2 * | 12/2009 | Berger | ........................ | 345/582 |
| 7,630,750 B2 * | 12/2009 | Liang et al. | .................. | 600/407 |
| 2003/0048936 A1 | 3/2003 | Fan et al. | | |
| 2003/0160785 A1 | 8/2003 | Baumberg | | |
| 2004/0184655 A1 * | 9/2004 | Ziegler et al. | ................ | 382/154 |
| 2005/0081161 A1 * | 4/2005 | MacInnes et al. | ........... | 715/765 |
| 2005/0131659 A1 | 6/2005 | Mei et al. | | |

OTHER PUBLICATIONS

International Search Report and the Written Opinion of the International Searching Authority issued in Patent Application No. PCT/US05/12817 dated on Aug. 28, 2008.

* cited by examiner

*Primary Examiner*—Stephen S Hong
*Assistant Examiner*—Matthew J Ludwig
(74) *Attorney, Agent, or Firm*—McDermott Will & Emery LLP

(57) ABSTRACT

Method and system for 3D data editing is disclosed. A 3D volumetric data is rendered in a rendering space. A 2D graphical drawing tool is selected and used to create a 2D structure. Apply a 3D operation to the 3D volumetric data based on the 2D structure.

51 Claims, 8 Drawing Sheets

INTERACTIVE 3D DATA EDITING VIA 2D GRAPHICAL DRAWING TOOLS

The present invention claims priority of provisional patent application No. 60/562,261 filed Apr. 15, 2004, the contents of which are incorporated herein in their entirety.

BACKGROUND OF THE INVENTION

1. Field of the Invention

The present invention relates generally to a method and system for information processing and systems incorporating the present invention. Specifically, the present invention relates to three-dimensional (3D) data editing and systems incorporating the present invention.

2. Description of Related Art

Many non-intervention scanning devices produce 3D or higher dimensional data sets. For examples, in medical domains, different scanning devices such as CT, MR, and ultrasound produce data that can be stacked to form a 3D volume from a set of cross sectional slices. In archaeology, researchers utilize scanning devices to recover internal structures of a site without having to physically dig in the site. In seismic or geologic study, ultrasound devices are employed to detect the depth or structure of the underground. Similarly, in other scientific fields, data may be organized as slices in some high dimensional space.

To facilitate effective exploration of 3D data, techniques and/or tools have been developed to allow visualizing, interacting, and/or editing such 3D data. As 3D data is often presented in its projection form in a 2D space, one important issue is how intuitive and convenient a tool should be in order to support effective 3D data manipulation. Conventionally, a keyboard, a mouse, and a 2D display device are used as input and output devices to perform data manipulation on the 2D display device. 2D data manipulation can be naturally achieved via a 2D display device. For example, a user may easily draw a 2D area on a screen of a 2D display device on which a 2D image is displayed in order to segment, for example, an object of interest contained in the 2D image. On the other hand, however, it may not be as intuitive to segment a 3D object of interest (a sub-volume) contained in a 3D volume rendered as a projection on a 2D display device.

In existing 3D data manipulation systems, although 3D data may be visualized as a 3D entity on a 2D display device, 3D data editing on a 2D display device is usually achieved by editing one 2D slice at a single time. This mode of operation is awkward because while editing, it draws a user's focus to a dimension (2D) that is inconsistent with the dimension of the data itself (3D). In addition, because this mode of operation confines a user's view to a lower dimension space, it makes it difficult or requires special skills to mentally correlate what is being performed in a lower dimension space to the effect in a higher dimensional space.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present invention involves a method and system that enable 3D data editing via 2D drawing tools. A 2D-based tool is used to draw or paint on a pseudo-2D canvas to create a 2D structure, which is then converted into a corresponding 3D structure. A 3D operation can then be applied to a 3D object rendered on a 2D screen based on the 3D structure. The invention described herein provides a user with an intuitive way to apply a desired 3D operation to a 3D data set using familiar 2D tools on a conventional 2D display. This facilitates a What-You-See-Is-What-You-Get (WYSIWYG) like 3D data manipulation, which gives a user a sense of manipulating 3D data directly in a 3D space and observing the result of such a 3D operation directly in the 3D space. A 3D operation may also be combined with automated data processing capabilities to achieve interactive 3D data manipulation.

In its operation, a 3D volume is rendered in a 2D rendering space of a 2D display interface. There may be one or more planes, each being set in a specific viewing mode, which may intersect with the 3D volume. A user may select one of a plurality of 2D drawing tools made available visually in a different region of the 2D display interface and use the selected 2D drawing tool to create a 2D structure in the 2D rendering space. 2D points that constitute the 2D structure are transformed into a plurality of 3D points constituting a 3D structure with respect to the 3D volume. The necessary transformation is applied to convert 2D based drawing instructions into 3D editing operations with respect to the 3D volume. A single 3D editing operation may achieve simultaneous multiple plane draw and/or paint operations. The present invention as described herein facilitates both 3D image editing and 3D object editing. Details of different aspects of the invention are described below.

Figure 1:
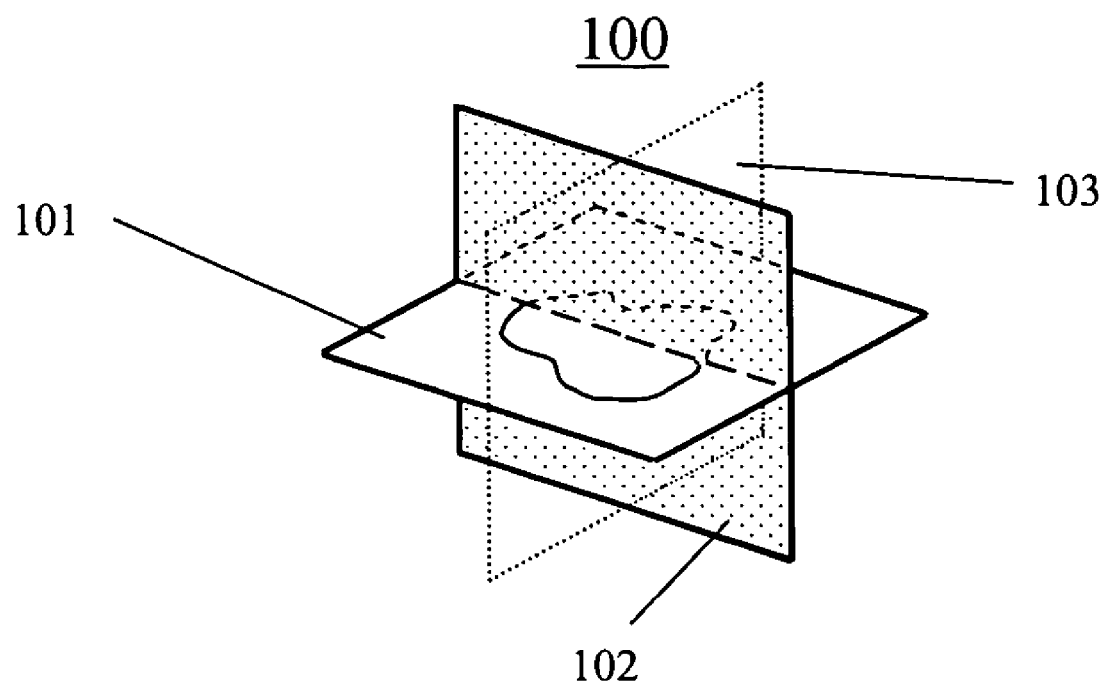
FIG. 1 depicts a 3D space with three exemplary orthogonal planes in three different appearance modes, according to an embodiment of the present invention.

FIG. 1 depicts a 3D space 100 with exemplary orthogonal planes in three different appearance modes, according to an embodiment of the present invention. In this exemplary configuration, there are three exemplary orthogonal planes 101, 102, and 103 that slice through the 3D space 100. Each of the planes in the 3D space 100 may be set in one of three appearance modes: an opaque mode (as shown with respect to the plane 101), a transparent mode (as shown with respect to plane 102), and an invisible mode (as shown with respect to plane 103). The mode of each plane may be set independently. When a plane is in the opaque mode, any data points that coincide with the underlying plane may be shown using the values of the data points. For example, if an image overlaps with a plane set in an opaque mode, the original gray scale intensity of the image may be shown on the opaque plane. When a plane is in the transparent mode, the appearance of the plane is a transparent image. When a plane is in invisible mode, the appearance of the plane is not made visible. In one embodiment, when one plane is in the opaque mode and the other plane is in the transparent mode, a portion of the image on the opaque plane that is behind the plane in the transparent mode may be seen as a transparent image to give a sense of 3D scenery. In a different embodiment, a color tone may be applied to a transparent plane to provide a transparent feeling in the 3D space 100.

The 3D space 100 as described in FIG. 1 may be configured in a coordinate system such as a right-handed coordinate system with, for instance, the Z-axis pointing upward and being initialized as a 3D space looking from a far away viewpoint in the first octant and looking into the origin. The entire scene in such a 3D space may be rotated via, for example, a mouse-dragging operation. Such a rotation may be restricted in a certain manner. In one embodiment, a rotation may be limited to be with respect to a particular axis, e.g., Z-axis or X-axis only. Such a restriction may be put in place to provide a user a feel of a "ground level" so that the user may not lose orientation in the 3D space as they might when rotating using a trackball. In addition, each plane in the 3D space 100 may be shifted along an axis that is perpendicular to the surface of the plane. Such a shift may be effectuated by dragging the border of the plane or anywhere in the plane in order to move along its perpendicular direction.

One or more 3D solid objects or a 3D volume may be placed within the 3D space 100 described herein. A 3D solid object may correspond to a segmented 3D object produced, for example, by an image segmentation routine. In the 3D space 100, a user may visualize a 3D solid object with one or more planes present. In one embodiment, the three exemplary orthogonal planes 101, 102, and 103 may be present in a rendered 3D scene and each may slice through the 3D object from a different direction. The contour of a cross section or a slice of the 3D solid object created by a slicing plane may overlap with the plane. In this embodiment, when a plurality of 3D objects are rendered, an observer may perceive the spatial relationships of these 3D solid objects.

Figure 2:
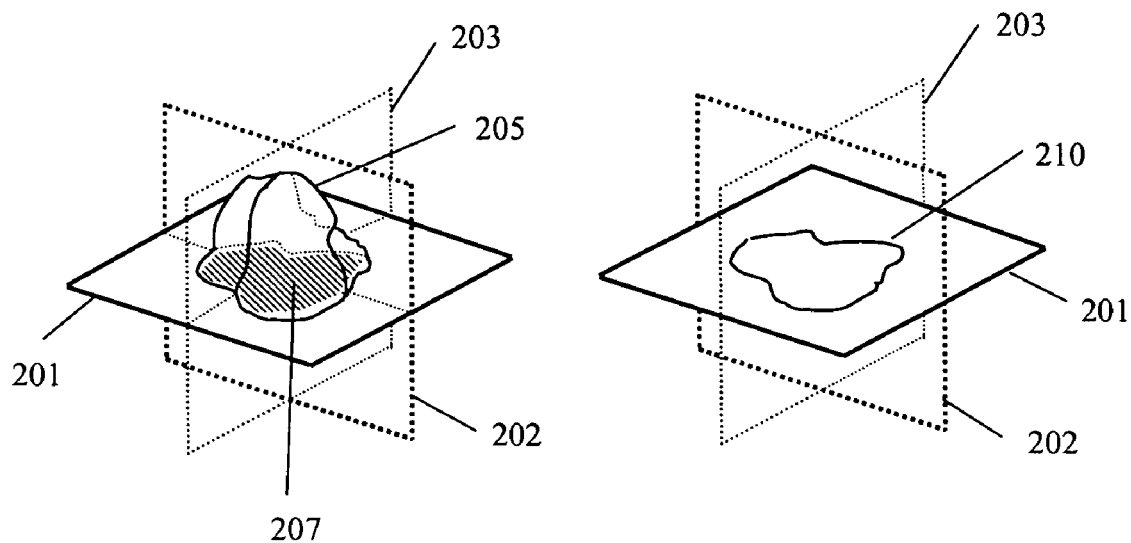
FIG. 2(a) shows a 3D object rendered in a 2D rendering space with three orthogonal planes intersecting the 3D object, according to an embodiment of the present invention.
FIG. 2(b) shows a boundary of a cross section of a 3D object that coincides with a plane set in an opaque mode, according to an embodiment of the present invention.

FIG. 2(a) shows a 3D object 205 rendered on a 2D screen with three orthogonal planes 201, 202, and 203 intersecting the 3D object 205, according to an embodiment of the present invention. In this example, the plane 201 is set to be in an opaque mode and the planes 202 and 203 are set to be in an invisible mode. Since the plane 201 is in an opaque mode and the other two planes are invisible, the image of a cross section of the 3D object 205 that coincides with the plane 201 is fully visible as, for instance, a gray scale image. The shaded area 207 in FIG. 2(a) illustrates that. FIG. 2(b) shows a boundary 210 of a cross section of a 3D object that coincides with a plane 201 set in an opaque mode, according to an embodiment of the present invention.

In another embodiment, a 3D volume can be rendered in the 3D space 100. Since there is no segmented object, when a plane in an opaque mode slices through the 3D volume, an image of the entire slice of the 3D volume is visible on the plane.

Figure 3:
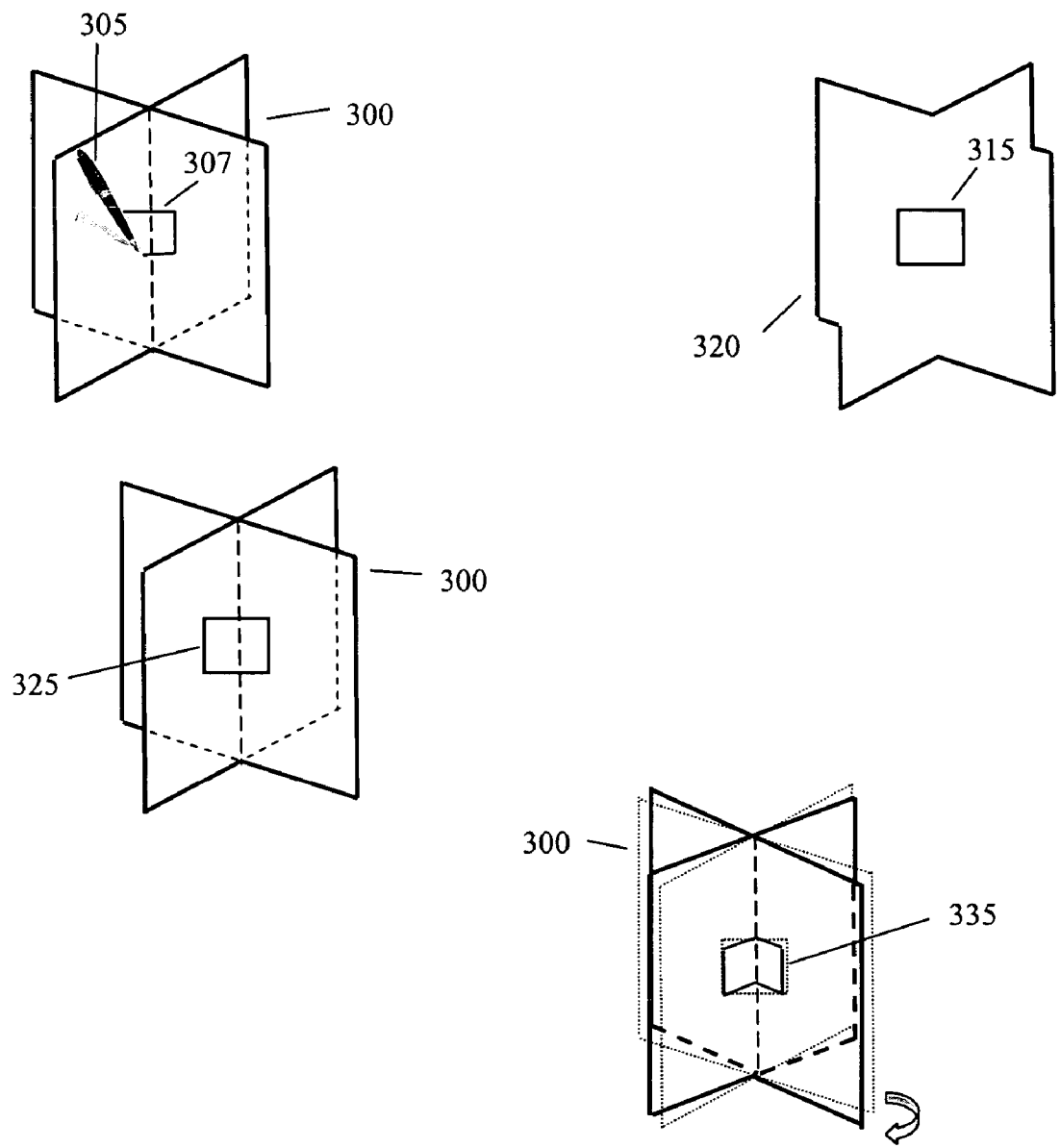
FIG. 3 describes an example of 3D editing using a 2D drawing tool, according to an embodiment of the present invention.

An exemplary process of 3D editing as shown in FIG. 3 illustrates the working principle of 2D based 3D editing. In this example, an original 3D space 300 is rendered in a 2D rendering space. A 2D drawing pen 305 may be selected and used to create a 2D structure 307. To a user, such a drawing operation and the 2D structure 307 created are viewed as occurring in the 3D space 300 even though the 2D structure 307 so created is strictly 2D. In one embodiment, to effectuate a 3D operation based on the 2D structure 307, the outer boundary of the planes in the 3D space 300 may be treated as a 2D canvas 320 and a completed 2D structure 315 may be treated as a 2D drawing on the 2D canvas 320. The 2D structure 315 may then be transformed into a 3D structure 325 with respect to which a 3D operation may be applied in the 3D space 300. Coordinates of 2D points constituting the 2D structure 315 may be transformed into 3D coordinates of 3D points constituting the 3D structure 325. Details related to the transformation from the 2D structure 315 to the 3D structure are discussed with reference to FIG. 6 and FIG. 8. The transformed 3D structure may define a scope of a desired 3D operation to be performed in the 3D space 300. In some embodiments, such defined scope is salient against any movement of the 3D space 300. For example, as shown in FIG. 3, the 3D structure 325 derived may change when the planes in the 3D space 300 are rotated and an updated 3D structure 335 may be accordingly created.

In some embodiments, a 3D point transformed from a 2D point created in a drawing action may be restricted to, for example, be a point on a plane in an opaque mode. In some embodiments, when a plane is in a transparent mode, a 3D point transformed from a 2D point created from a 2D drawing action may be restricted to be a 3D point on a plane that is the first opaque plane behind a transparent plane. A 3D structure that encloses a region on a plane may be interpreted as a segmentation to be applied to a cross section image projected on the plane. In some embodiments, further processing or analysis may be applied to such segmented regions as part of the 3D operation performed in the process of 3D editing.

Figure 4:
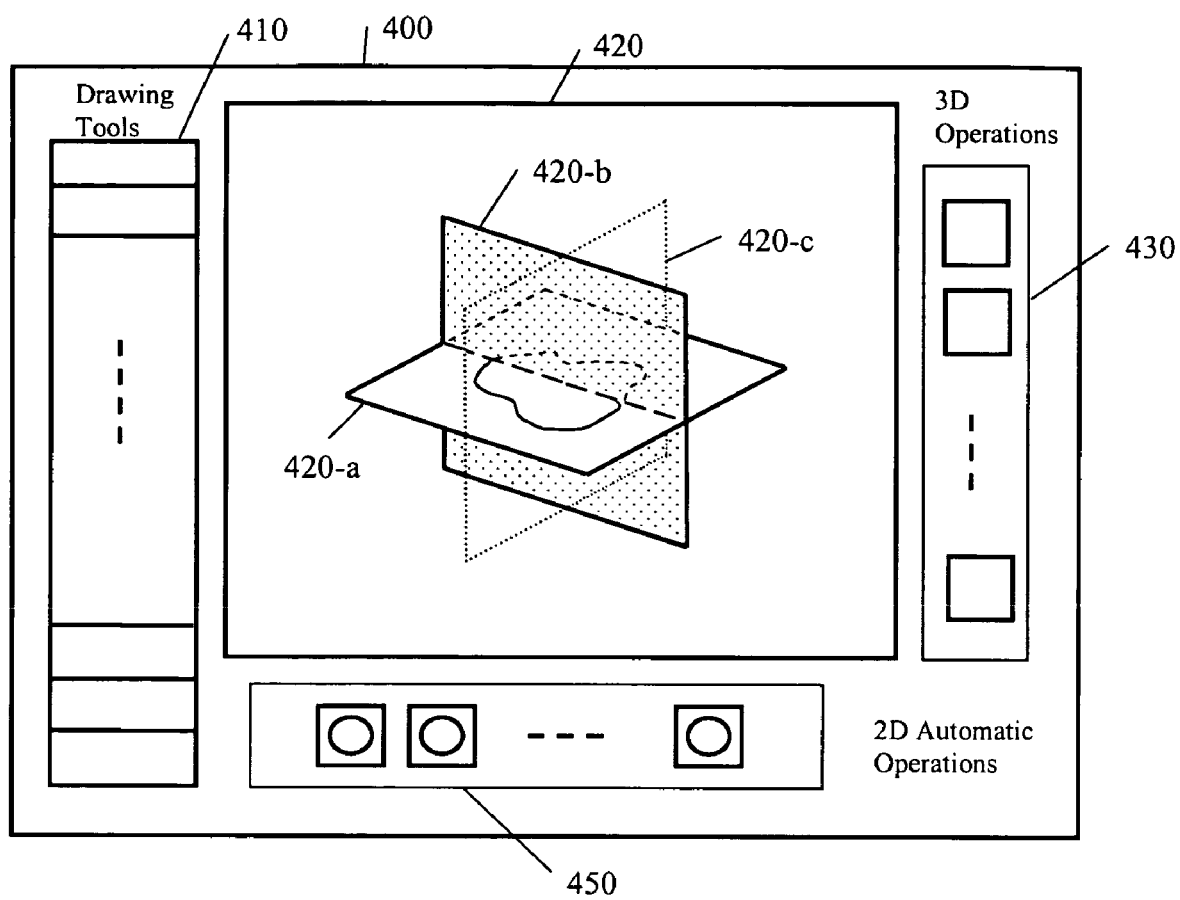
FIG. 4 shows an exemplary user interface of 3D data editing using 2D drawing tools, according to an embodiment of the present invention.

In some embodiments, 2D based 3D editing may be facilitated through a graphical user interface. FIG. 4 shows an exemplary graphical user interface 400 for 2D based 3D data editing, according to an embodiment of the present invention. The exemplary interface 400 comprises a data rendering region 420, a 2D drawing tool box 410, a collection of available automatic 2D processing operations 450, and a collection of available 3D operations 430. A 3D data set may be rendered in the 2D rendering region 420. As described before, a 3D data set may be rendered in the rendering region 420 with one or more planes present and each of such planes may be set in one of the three appearance modes. In FIG. 4, there are three orthogonal planes 420-a, 420-b, and 420-c with the horizontal plane 420-a set in an opaque mode, the vertical plane 420-b set in a transparent mode, and the depth plane 420-c set in an invisible mode. The mechanism to set or reset the mode of each plane may be activated via, for example, some graphical buttons (not shown in FIG. 4).

Within the tool box 410, a list of 2D drawing tools may be visualized in a certain form such as buttons that can be selected by a user through, e.g., a mouse click. A selected 2D drawing tool may be used to manually perform a corresponding 2D drawing action to create a 2D structure within the rendering region 420. Various exemplary 2D drawing tools may be used to facilitate 2D based 3D editing. Such 2D drawing tools may include tools for a 2D drawing operation, a paint operation, a fill operation, an erase operation, and a delete operation. A 2D drawing operation relates to a drawing action similar to using a pen drawing on a piece of paper. In some embodiments, a 2D drawing operation may be used to delineate a border or a boundary of some regions.

A 2D paint operation is a region based drawing operation similar to using a paint brush to paint a region along a trajectory on a piece of paper. A 2D paint tool may be used with a desired width for the brush. Alternatively, a 2D paint tool may have a selectable shape. A 2D fill operation is performed with respect to a region delineated by an enclosed contour. To fill the interior portion of the region, a 2D fill operation may be carried out by dropping a seed within the region and then the interior of the entire region can be automatically filled. A 2D erase operation refers to a 2D operation that removes each pixel value wherever it traverses. A 2D eraser may be associated with a shape or a size. A delete operation refers to a 2D operation that is used to remove a 2D entity. Examples of such a 2D entity include a 2D curvilinear structure, an enclosed 2D contour, and a 2D region.

In some embodiments, a 2D structure may also be created semi-automatically by coupling one of the automatic 2D data processing operations 450 with a 2D drawing action. Each of the available automatic 2D data processing operations 450 may be visualized, e.g., as an icon or a button, so that it can be selected or activated. To perform semi-automatic 2D drawing, a user may couple a selected automatic 2D data processing operation with a selected 2D drawing tool. In operation, while the user is making a drawing in the rendering region 420 using the selected 2D drawing tool, the coupled automatic processing operation is applied with respect to the drawing result.

In some embodiments, the semi-automatic operation as described herein may correspond to an interactive process to create a 2D structure. For example, a manual 2D drawing action may produce a 2D bounding box around an object of interest in, e.g., an image of a cross section of a 3D volume, and a coupled automatic segmentation algorithm may then be applied to identify an object within the constraint of such a bounding box. Another example is an intelligent scissor that can be used to identify, for instance, a contour of a region of interest such as an object. To effectuate a semi-automated scissor operation, a 2D drawing tool may be selected to populate one or more seed points along the visual contour of an object in an image and then an automatic interpolation operation may be applied with respect to the seed points to automatically identify the complete contour of the object that delineates the object from its exterior regions. With such a semi-automatic scissor operation, a user may be able to interactively perform segmentation to extract the contour of an object without having to carefully draw the contour along the boundary of the object. Other automated data processing algorithms may also be coupled with a 2D drawing action to achieve semi-automated operations.

To achieve 3D editing via 2D drawing tools, a 3D editing operation may be applied to an underlying 3D data set with respect to the 2D structure derived using a 2D drawing tool. For example, if a 2D structure is created within the rendering region 420, a 3D editing operation may be applied to the 3D data set rendered in the region 420 with respect to a constraint that is translated from the 2D structure. In some embodiments, the 3D constraint may be defined by a 3D structure that is created by transforming the 2D structure with respect to one or more planes in the rendering region 420. The transformed 3D structure may correspond to a 3D drawing that is simultaneously on multiple planes. Such a 3D structure can be visualized when those multiple planes are set in an opaque mode. One example is shown via the 3D structure 325 in FIG. 3. In this example, a box drawn in 2D crosses two orthogonal planes in opaque mode and the 2D box is projected on both planes to form a 3D structure.

In some embodiments, the 3D constraint may correspond to a 3D patch on the surface of a 3D object rendered in the rendering region 420. Such a 3D patch may be generated based on a transformation from the drawn 2D structure with respect to the 3D object. The 3D patch may limit the region where a 3D editing operation is applied to the 3D object.

A transformation from a 2D structure to a 3D structure may involve deriving corresponding 3D points that constitute the 3D structure from 2D points that constitute the 2D structure. In some embodiments, the 3D points of the 3D structure may be points on the surface of a 3D object rendered in the rendering region 420. In another embodiment, the 3D points of the 3D structure may be points on one or more planes in the rendering region 420 (e.g., when there is no pre-segmented 3D object present). There are different means to derive such 3D points. In some embodiments, 3D points may be derived through a ray tracing initiated from each of the 2D points of the 2D structure along a direction represented by a shooting ray. For example, to identify a corresponding 3D point on the surface of a 3D object rendered in region 420, a shooting ray may be constructed based on a 2D point along a direction, e.g., the direction that goes into the 2D display screen, and a tracing may then be performed along the shooting ray until reaching an intersection point between the shooting ray and the surface of the 3D object. This intersection point is the corresponding 3D point sought.

In some embodiments, 3D points may be derived analytically by solving for an intersection point between a 3D plane and the shooting ray. The 3D plane may correspond to one of the orthogonal planes present in the rendering region 420. Alternatively, the 3D plane may also correspond to a planar surface of the 3D object in the rendering region 420.

The relationship between a 3D scene and a 2D screen is similar to viewing a 3D world through a camera, in which a transformation T is applied to points in the 3D world to derive 2D points on a 2D screen. Identifying a 3D point on a 3D plane based on a 2D point in a 2D scene is an inverse process. In this inverse process, the 3D point sought is an intersection point between a 3D plane and a shooting ray originating from a 2D point in a 2D scene. This intersection point can be analytically solved for if the planar equation for the 3D plane is known.

To apply this working principle in 2D based 3D editing, an important step is to carry out the transformation from a screen coordinate of a 2D point to a 3D coordinate in a 3D scene. In some embodiments, the transformation may comprise the step of transforming a screen coordinate to a 2D canvas coordinate and then the step of transforming from a 2D canvas coordinate to a 3D coordinate. The step of transforming a 2D screen coordinate into a 2D canvas coordinate may be needed when a 2D display screen such as the display screen 400 and a canvas such as the canvas 320 (see FIG. 3) adopt different conventions in their coordinate systems. For example, a screen coordinate system may use a top-left corner as its origin while a 2D canvas coordinate system may instead use a lower-left corner as its origin. In this case, a horizontal flip may be carried out to convert a 2D screen coordinate to a 2D canvas coordinate. Another exemplary discrepancy in coordinate systems between a 2D screen and a 2D canvas may be due to the fact that the 2D canvas may occupy only a portion of the 2D screen.

In some embodiments, identifying a 3D point of a 3D scene based on a 2D point on a canvas is achieved by solving for an intersection point between a shooting ray and a 3D plane represented by a known planar equation. Assume a 2D point in a 2D canvas coordinate system is (x, y). A shooting ray with a directional vector may be constructed using, for example, two points: an in-canvas point denoted by (x, y, $z_0$=0) and an out-of-canvas point denoted by (x, y, $z_1$), where the origin of the Z-axis is located on the 2D canvas. These two points may then be inversely transformed using the transformation T and the inversely transformed points may then be normalized to produce corresponding normalized 3D coordinates. Assume that such derived normalized 3D points are P1 and P2, respectively. A 3D directional vector V=P2−P1 can be obtained. A ray extending from point P1 along the direction of vector V may intersect a plane in a 3D scene at a 3D point P3, which can be obtained as P3=P1+k*V, where k is the distance from P1 to P3.

Assume that the intersecting 3D plane is formulated as Ax+By+Cz+D=0. If the 3D plane is orthogonal to one of the 3D coordinate axes, the 3D plane equation can be simplified. For example, if the 3D plane is orthogonal to the Z axis, the formulation becomes z+D=0. If the 3D plane is orthogonal to the X axis, the formulation becomes x+D=0. If the 3D plane is orthogonal to the Y axis, the formulation is then y+D=0. If P3 is on one of the orthogonal planes, e.g., on a 3D plane orthogonal to the Z axis (z+D=0), it satisfies the following equation P3*(0,0,1)+D=0. When substituting P3=P1+k*V, the equation becomes P1(z)+k*V(z)+D=0. The parameter k can then be calculated as k=(−D−P1(z))/V(z). Having obtained the value of k (the distance from P1 to P3), the intersection point P3 can then be obtained. Assume P3 has a coordinate denoted by ($x_3$, $y_3$, $z_3$), the coordinate position along each axis can then be computed as $x_3$=P1(x)+k*V(x), $y_3$=P1(y)+k*V(y), and $z_3$=−D, respectively. Therefore, P3 is the 3D intersecting point corresponding to a 2D canvas point (x, y).

A normalized 3D coordinate such as P3 may need to be further converted to a point in an image coordinate system. In some embodiments, this may involve a scale factor. For example, if each side of a plane in a normalized 3D coordinate system has a range between 0 and 1 and the number of pixels along each side of the plane is known to be $F_1$ and $F_2$, a normalized 3D coordinate, e.g., P3=($x_3$, $y_3$, $z_3$), may be converted to a 3D volume point with a coordinate ($x_3$*$F_1$, $y_3$*$F_2$, $z_3$).

When a 3D structure is created based on a 2D structure made using a 2D drawing tool, a 3D editing operation may be selected from a list of available 3D editing operations 430 and applied with respect to the 3D structure. In some embodiments, the 3D structure created based on the 2D drawing structure may be coupled with the selected 3D editing operation and used as a constraint in applying a 3D operation in a 3D scene. For example, when a 2D drawing overlaps with an area of a 3D solid object rendered in the rendering region 420, a 3D structure transformed based on the 2D drawing stroke may appear on the surface of the 3D solid object as a 3D patch, which may restrict where a 3D operation may be performed.

Various 3D editing operations may be made available within region 430 of the user graphical interface 400, including a 3D carving operation, a 3D gluing operation, and a 3D punch operation. Some of the 3D operations may be associated with certain operational parameters. For example, when a 3D carving operation is activated, the carving operation may be carried out within an area defined by a 3D patch on the surface of the 3D object and the carving operation may be effectuated by cutting into the 3D object with a controlled depth. A 3D gluing operation is to attach or glue a new object onto a 3D object, for example, at a location defined by the 3D structure created based on a 2D drawing structure. A 3D punch operation refers to an editing operation that corresponds to an infinite extrusion along the perpendicular direction of the drawing plane into the 2D screen to cut through the 3D object and the size and the shape of the opening is defined, for instance, by the 3D structure derived based on a 2D structure created using a 2D drawing tool.

Figure 5:
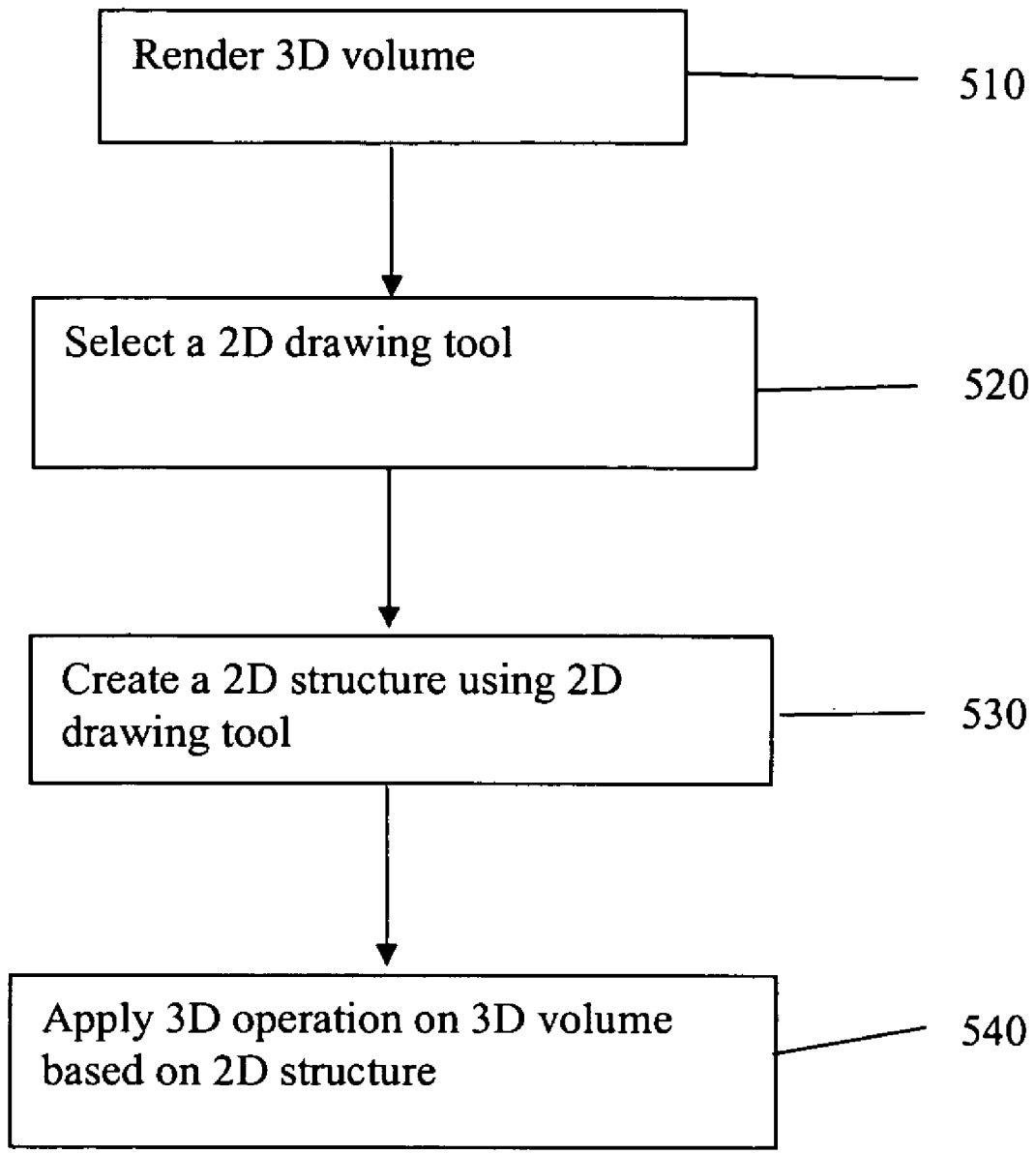
FIG. 5 is a flowchart of an exemplary process, in which 3D editing is achieved using a 2D drawing tool, according to an embodiment of the present invention.

FIG. 5 is a flowchart of an exemplary process, in which 3D editing is achieved using a 2D drawing tool, according to an embodiment of the present invention. A 3D data set is rendered, at 510, in a 2D rendering region of a 2D display screen. The rendered 3D data set may correspond to a 3D object or a 3D volume. To perform editing on the 3D data set, a 2D drawing tool is selected at 520 and a 2D structure is created, at 530, using the selected 2D drawing tool. As described earlier, the 2D drawing action may be coupled with one or more automatic processing operations to generate the 2D structure. Based on the 2D structure, a 3D editing operation is performed, at 540, with respect to the 3D data set.

Figure 6:
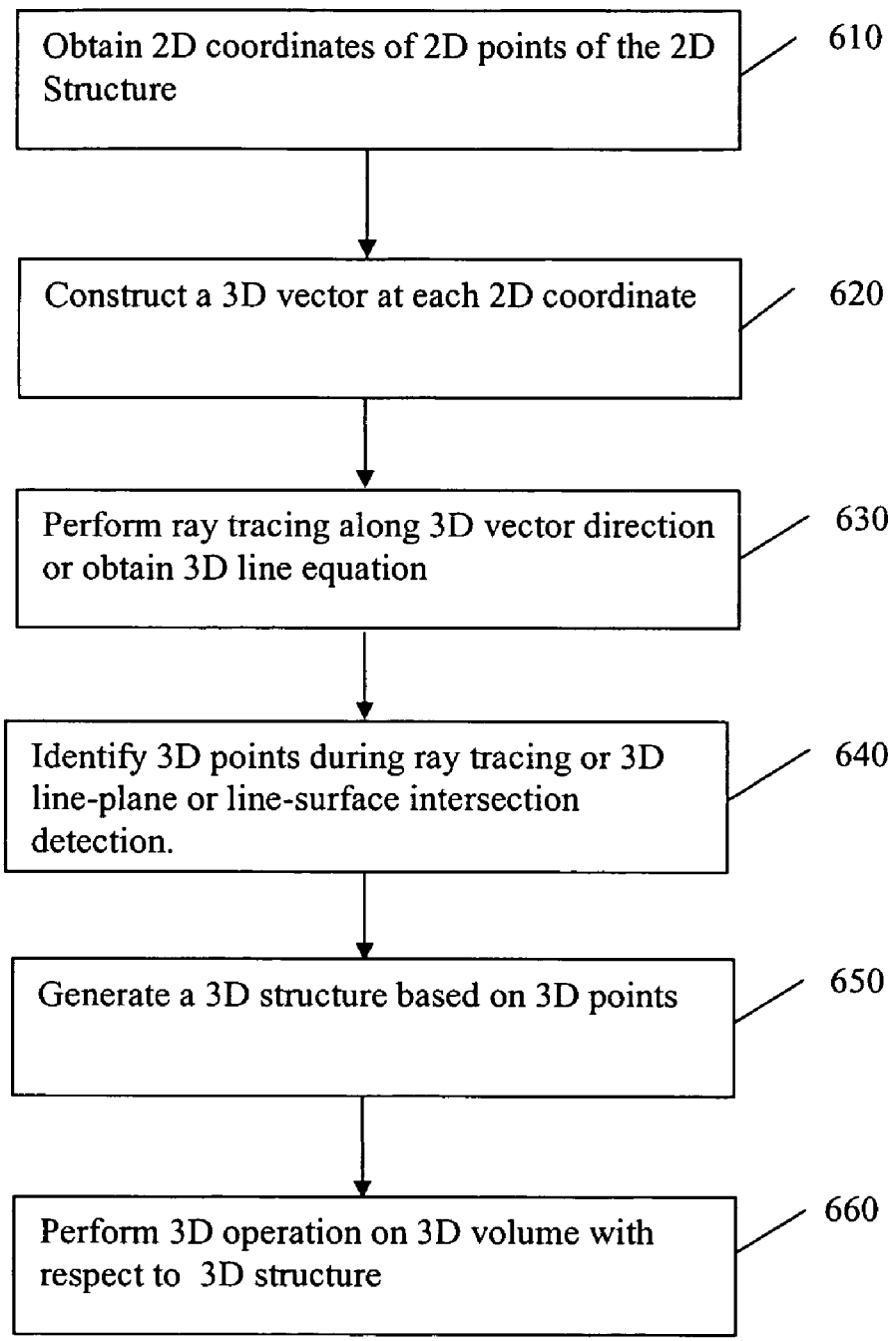
FIG. 6 is a flowchart of an exemplary process, in which a 3D data editing operation is applied to a 3D data set based on a 2D structure created using a 2D drawing tool, according to an embodiment of the present invention.

FIG. 6 is a flowchart of an exemplary process, in which a 3D data editing operation is applied to a 3D data set based on a 2D structure created using a 2D drawing tool, according to an embodiment of the present invention. In this exemplary flow, 2D coordinates of 2D points in a 2D structure are first obtained at 610. In some embodiments, the 2D coordinates may be obtained by transforming 2D screen coordinates to generate 2D canvas coordinates. To identify 3D coordinates of 3D points corresponding to the 2D coordinates, a 3D directional vector for each 2D point is constructed at 620. In some embodiments, based on each 3D directional vector, a ray tracing operation is performed at 630 in order to identify a 3D point on the surface of a rendered 3D object where the shooting ray in the direction of the 3D directional vector intersects the 3D object surface. In different embodiments, a formulation for a shooting ray in the direction of the 3D directional vector is obtained at 630 in order to derive a 3D intersection point between the shooting ray and a plane in the rendering region where a 3D volume visualized is obtained through an analytical means as described herein. Such 3D intersection points are obtained, at 640, via either ray tracing or an analytical solution and a 3D structure is created, at 650, based on these 3D intersection points. A selected 3D editing operation is then carried out, at 660, on the 3D data set with respect to the 3D structure generated based on the 2D structure created using a 2D drawing tool.

Figure 7:
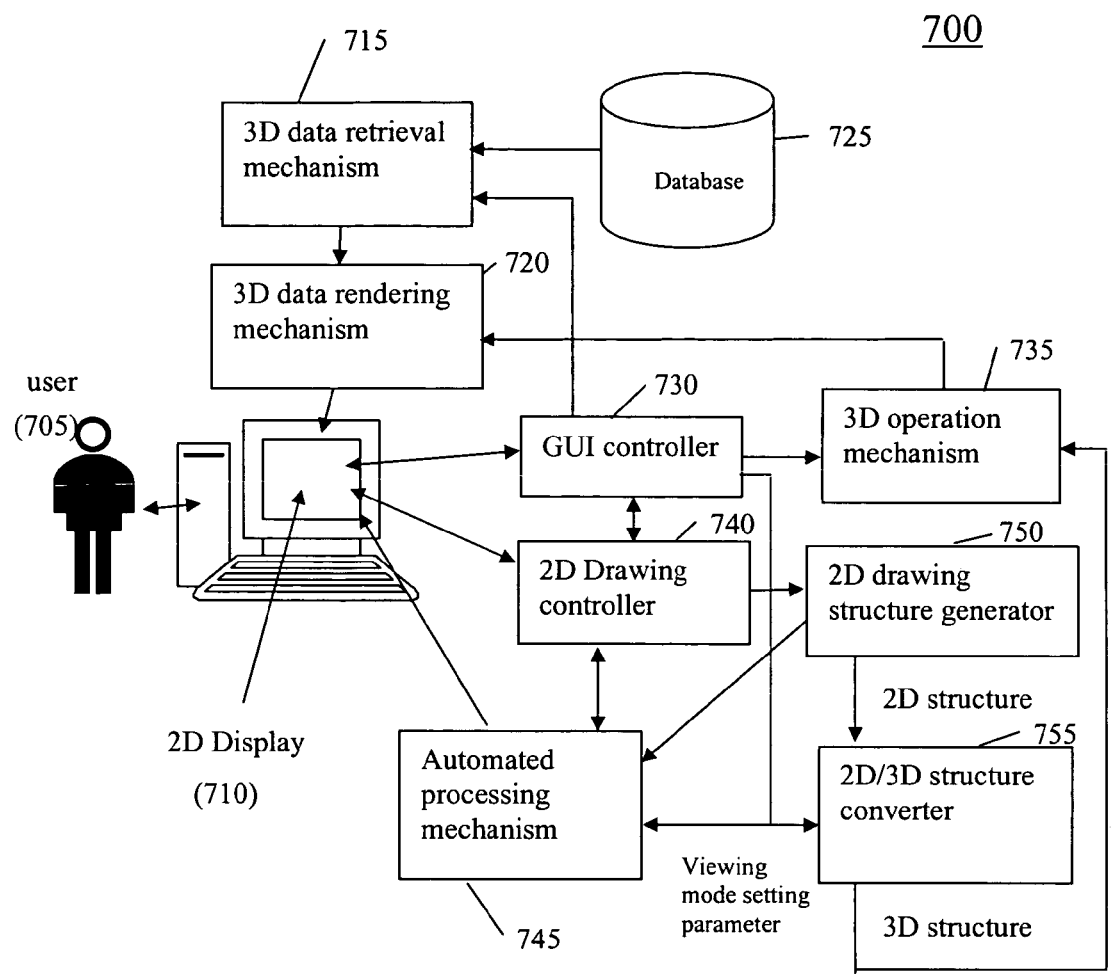
FIG. 7 depicts an exemplary construct of a system that facilitates 3D data editing using 2D drawing tools, according to an embodiment of the present invention.

FIG. 7 depicts an exemplary construct of a system 700 that facilitates 2D based 3D editing, according to an embodiment of the present invention. In this exemplary set up, the system 700 comprises a 2D display device 710, a database 725, a 3D data retrieval mechanism 715, a 3D data rendering mechanism 720, a GUI controller 730, a 2D drawing controller 740, an automated processing mechanism 745, a 2D drawing structure generator 750, a 2D/3D structure converter 755, and a 3D operation mechanism 735. In its operation, a user 705 interacts with the 2D display device 710 via, for example, a graphical user interface controlled by the GUI controller 730. When the user 705 indicates a desire to manipulate a 3D data set, the GUI controller 730 receiving a corresponding instruction may activate the 3D data retrieval mechanism 715 to retrieve the desired 3D data, which may be forwarded to the 3D rendering mechanism 720 that renders the 3D data set on the 2D display device 710.

To perform 2D based 3D editing on the 3D data set, the user 705 may select a 2D drawing tool via a user interface on the 2D display device 705. Such a selection may be received by the GUI controller 730 that may activate the 2D drawing controller 740 and hand the control to the 2D drawing controller 740 to interact with the user 705 to obtain, for example, 2D screen coordinates for 2D points drawn by the user 705 on the 2D display screen. The user 705 may use the selected 2D drawing tool to manually draw a 2D structure on the display screen. Alternatively, the user 705 may also elect to perform semi-automatic 2D drawing operations. The user 705 may specify to couple an automatic processing tool with the selected 2D drawing tool so that an automatic operation may be applied to a hand drawing made using the 2D drawing tool to derive a 2D structure. In this alternative, the GUI controller 730 may also activate the automated processing mechanism 745 that may interact with the 2D drawing controller 740 in order to apply automated processing with respect to the drawing made. The processing result from the automated processing mechanism 745 (a 2D structure such as a refined boundary of a 2D object contained in an image of a cross section of a 3D volume) may then be displayed on the 2D display device 710.

The 2D structure created using the selected 2D drawing tool (or in conjunction with an automatic 2D operation) may comprise a plurality of 2D points with 2D screen coordinates. These 2D coordinates may then be sent to the 2D structure generator 750 to create a 2D drawing structure in a canvas. The 2D structure generator 750 may internally perform a transformation from the 2D screen coordinates to derive corresponding 2D canvas coordinates. The generated 2D structure in a canvas space may then be forwarded to the 2D/3D structure converter 755, where 3D points corresponding to the 2D points in the 2D structure are identified. The 2D/3D structure converter 755 may employ different suitable approaches for identifying such 3D points in different situations. For example, as described herein, if the rendered 3D data set is a 3D object, a ray tracing approach may be employed. If the rendered 3D data set is not a 3D object, an analytical solution approach may be employed to derive 3D points. The output of the 2D/3D structure converter 755 is a 3D structure in a 3D space, which may comprise a plurality of 3D points, each of which is represented as a 3D coordinate. The 3D structure so generated may then be forwarded to the 3D operation mechanism 735, which may then carry out a 3D editing operation specified by the user 705 via, e.g., the GUI controller 730. As described herein, the 3D structure may be used as a constraint of the scope of the desired 3D operation.

Figure 8:
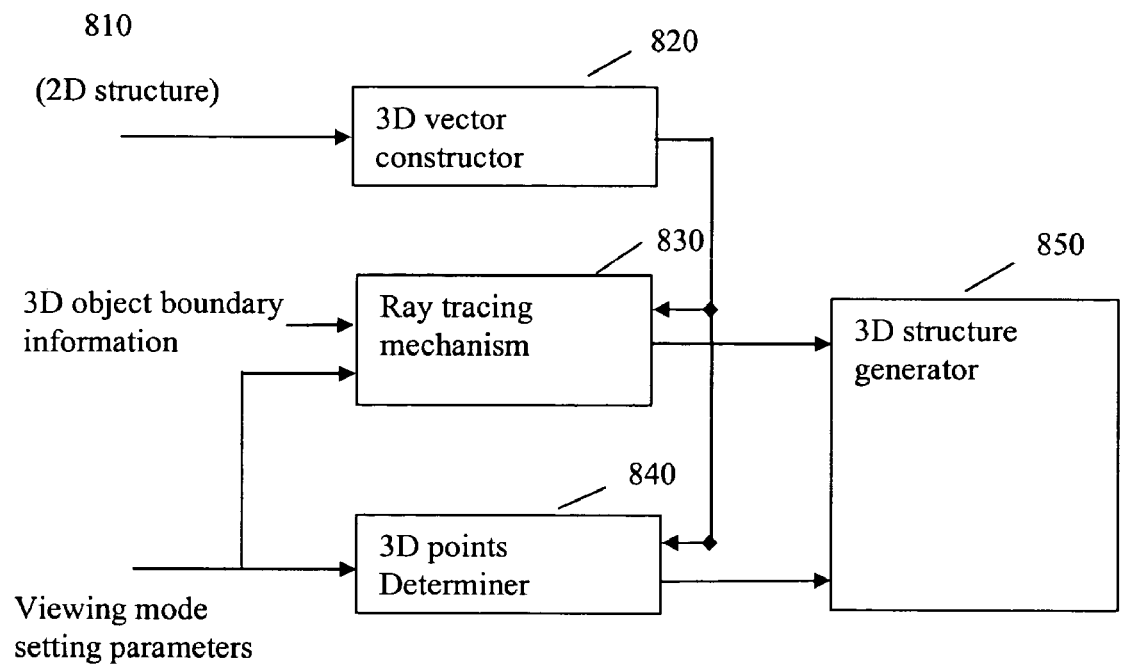
FIG. 8 depicts an exemplary internal structure of a 2D/3D structure converter, according to an embodiment of the present invention.

FIG. 8 depicts an exemplary internal structure of the 2D/3D structure converter 755, according to an embodiment of the present invention. In this exemplary structure, the 2D/3D structure converter 755 comprises a 3D vector constructor 820, a ray tracing mechanism 830, a 3D intersection point determiner 840, and a 3D structure generator 850. Given a 2D structure 810 as an input, the 3D vector constructor 820 generates a 3D directional vector for each of the points in the 2D structure 810. In some situations, the ray tracing mechanism 830 may be activated to identify a corresponding 3D point in a 3D coordinate system for each of the 2D points in the 2D structure. The ray tracing is performed along a direction of the 3D directional vector initiated from the 2D point. In other situations, the 3D intersection point determiner 840 may be activated to derive corresponding 3D points via analytical means. A viewing mode of each of the planes present in a rendering region and/or 3D surface information of a rendered 3D object may be used in identifying corresponding 3D points. The identified D points are then forwarded to the 3D structure generator 850 to produce a 3D structure in the underlying 3D space.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method for manipulating 3D data, comprising:
   rendering 3D volumetric data obtained from one or more medical devices in a rendering space on a display screen;
   facilitating a user to select a 2D graphical drawing tool via an interface displayed on the display screen;
   creating a 2D structure in the rendering space based on a drawing made by the user via interaction on the display screen using the selected 2D drawing tool;
   computing a 3D structure based on a projection of the 2D structure to the 3D volumetric data;
   manipulating the 3D volumetric data to produce updated 3D volumetric data based on the 3D structure that serves as a constraint of the manipulation; and
   displaying the updated 3D volumetric data on the display screen.

2. The method according to claim 1, wherein the 3D volumetric data occupies a 3D space, which is divided by three planes.

3. The method according to claim 2, wherein each of the planes is set to be in one of an opaque viewing mode, a transparent viewing mode, and an invisible viewing mode.

4. The method according to claim 3, wherein a cross section of the 3D volumetric data can be visualized on one of the three planes when the one plane slices through the 3D volumetric data.

5. The method according to claim 4, wherein a cross section of the 3D volumetric data is visualized on one of the planes in one of an opaque mode, a transparent mode, and an invisible mode.

6. The method according to claim 5, wherein a cross section of the 3D volumetric data can be visualized on one of the planes in a transparent mode using a color tone.

7. The method according to claim 3, wherein the 3D volumetric data comprises one or more 3D objects.

8. The method according to claim 7, wherein one or more of the 3D objects are pre-segmented.

9. The method according to claim 1, wherein the 2D drawing tool is used to perform a 2D operation to yield the 2D structure.

10. The method according to claim 9, wherein the 2D operation includes at least one of:
    a drawing operation;
    a paint operation;
    a fill operation;
    an erase operation; and
    a delete operation.

11. The method according to claim 10, wherein the 2D structure created using the 2D drawing tool comprises a plurality of 2D points, each of which is defined by a 2D coordinate.

12. The method according to claim 11, wherein said creating the 2D structure comprises:
    applying the 2D drawing tool, generating the plurality of 2D points constituting the 2D structure; and
    obtaining a 2D coordinate of each of the 2D points.

13. The method according to claim 11, wherein said manipulating comprises:

identifying 3D points corresponding to the 2D points of the underlying 2D structure;

obtaining 3D coordinates of the 3D points, forming a 3D structure; and performing the 3D operation with respect to the 3D structure.

14. The method according to claim 13, wherein said identifying a corresponding 3D point comprises:

constructing a 3D vector based on a 2D point of the 2D structure wherein the 3D vector is originated from the 2D point and points in a pre-defined tracing direction; and performing a ray tracing in the tracing direction to derive one or more 3D points along the tracing direction.

15. The method according to claim 13, wherein a 3D point derived during the ray tracing is a point at a pre-specified depth along the tracing direction.

16. The method according to claim 13, wherein a 3D point derived during the ray tracing is an intersection point between the 3D vector and a surface of a 3D object in the volumetric data.

17. The method according to claim 13, wherein a 3D point derived during the ray tracing is a point on one of the three orthogonal planes that intersects with the 3D vector and is the first plane that is set in an opaque viewing mode.

18. The method according to claim 9, wherein the 2D operation is coupled with an automatic processing process applied with respect to the 2D structure to effectuate a semi-automatic drawing operation.

19. The method according to claim 18, wherein the 2D structure with respect to which an automatic processing process can be applied includes a bounding box.

20. The method according to claim 19, wherein the automatic processing process includes an automatic image processing process.

21. The method according to claim 19, wherein the automatic processing process includes an automatic image segmentation process.

22. The method according to claim 1, wherein the manipulation performed on the 3D volumetric data includes at least one of:

a carving operation;
a gluing operation; and
a punch operation.

23. A method for manipulating a 3D object, comprising:

rendering a 3D object obtained from one or more medical devices in a rendering space on a display screen, wherein the 3D object has a 3D boundary;

facilitating a user to select a 2D graphical drawing tool via an interface displayed on the display screen;

creating a 2D structure in the rendering space based on a drawing made by the user via an interaction on the display screen using the selected 2D drawing tool;

computing a 3D structure based on a projection of the 2D structure to the 3D object;

manipulating the 3D object to produce an updated 3D object based on the 3D structure that serves as a constraint of the manipulation; and displaying the updated 3D object on the display screen.

24. The method according to claim 23, wherein the 3D object occupies a 3D space with three orthogonal planes, each of which is set in one of an opaque viewing mode, a transparent viewing mode, and an invisible viewing mode.

25. The method according to claim 24, wherein the 2D structure is generated in a 2D space in which the 3D object is rendered and comprises a plurality of 2D points, each being represented by a 2D coordinate.

26. The method according to claim 25, wherein said manipulating comprises:

identifying 3D points corresponding to the 2D points of the underlying 2D structure;

obtaining 3D coordinates of the 3D points, forming a 3D structure; and performing the 3D operation with respect to the 3D structure.

27. The method according to claim 26, wherein said identifying a corresponding 3D point comprises:

constructing a 3D vector based on a 2D point of the 2D structure wherein the 3D vector is originated from the 2D point and points in a pre-defined tracing direction; and performing a ray tracing in the tracing direction to derive one or more 3D points along the tracing direction.

28. The method according to claim 27, wherein a 3D point derived during the ray tracing is an intersection point between the 3D vector and a point on the surface of the 3D object.

29. The method according to claim 23, wherein the 2D drawing tool includes at least one of:

a drawing tool;
a paint tool;
a fill tool;
an erase tool; and
a deletion tool.

30. The method according to claim 23, wherein the manipulation performed on the 3D object includes at least one of:

a carving operation for carving out a portion of the 3D object with a pre-defined depth associated with the carving;

a gluing operation for attaching to the 3D object at a location associated with the 2D structure; and a punch operation for cutting out a portion of the 3D object.

31. The method according to claim 23, wherein the 3D object corresponds to a region of interest in a 3D medical imagery data wherein the 3D object is pre-segmented.

32. The method according to claim 30, wherein the region of interest in a 3D medical imagery data corresponds to an anatomical organ.

33. The method according to claim 32, wherein the region of interest corresponds to a growth detected from in the 3D medical imagery data.

34. The method according to claim 31, wherein the region of interest corresponds to a portion of an anatomical structure.

35. A method for segmenting 3D volumetric data, comprising:

rendering the 3D volumetric data obtained from one or more medical devices in a rendering space on a display screen where the 3D volumetric data is intersected by at least one of three planes in the rendering space;

facilitating a user to select a 2D graphical drawing tool via an interface displayed on the display screen;

creating a 2D structure in the rendering space based on a drawing made by the user via interaction on the displaying screen using the selected 2D drawing tool; and applying a segmentation operation on the 3D volumetric data based on the 3D structure that serves as a constraint of the segmentation; and displaying a result of the segmentation operation on the display screen.

36. The method according to claim 35, wherein the three planes are orthogonal.

37. The method according to claim 35, wherein each of the three planes can be set in one of an opaque view mode, a transparent viewing mode, and an invisible viewing mode.

38. The method according to claim 37, wherein the 2D structure comprises a plurality of 2D points in the rendering space and each of the 2D points is represented by a 2D coordinate.

39. The method according to claim 38, wherein said applying comprises:
   identifying 3D points corresponding to the 2D points of the underlying 2D structure to form a corresponding 3D structure; and
   performing the segmentation operation on the 3D volumetric data based on the 3D structure.

40. The method according to claim 39, wherein said identifying a corresponding 3D point comprises:
   constructing a 3D vector based on a 2D point of the 2D structure wherein the 3D vector is originated from the 2D point and points in a pre-defined tracing direction; and
   performing a ray tracing in the tracing direction to identify a 3D point along the tracing direction.

41. The method according to claim 40, wherein the 3D point derived during the ray tracing is a point on one of the three planes that intersects with the 3D vector and is the first plane encountered during the tracing that is set in an opaque viewing mode.

42. The method according to claim 35, wherein the segmentation operation performed on the 3D volumetric data includes:
   segmenting a portion of a cross section of the 3D volumetric data wherein the cross section is visualized on one of the three planes in an opaque viewing mode;
   segmenting a portion of the 3D volumetric data wherein the portion segmented is determined based on more than one segmentations performed on more than one cross sections of the 3D volumetric data visualized on at least one of the three planes.

43. The method according to claim 42, wherein said segmenting a portion of the 3D volumetric data based on more than one segmentation comprises:
   utilizing the more than one segmentations as initial seed points;
   performing interpolation based on the initial seed points and the 3D volumetric data; and
   obtaining a 3D surface from the interpolation that encloses a sub-volume of the 3D volumetric data.

44. A method for editing 3D medical data, comprising:
   rendering 3D medical data associated with a patient, obtained from one or more medical devices, in a rendering space on a display screen;
   facilitating a user to select a 2D graphical drawing tool via an interface displayed on the display screen;
   creating a 2D structure in the rendering space based on a drawing made by the user via interaction on the display screen using the selected 2D drawing tool;
   computing a 3D structure based on a projection of the 2D structure to the 3D medical data;
   manipulating the 3D medical data to produce updated 3D medical data based on the 3D structure that serves as a constraint of the manipulation; and
   displaying the updated 3D medical data on the display screen.

45. The method according to claim 44, wherein the 3D medical data corresponds to a pre-segmented object.

46. The method according to claim 45, wherein the pre-segmented object is a lesion.

47. The method according to claim 44, wherein the manipulation performed on the 3D medical data facilitates segmentation of an object imaged in the 3D medical data.

48. A 3D data manipulation system, comprising:
   a 3D rendering mechanism configured to render 3D volumetric data obtained from one or more medical devices in a rendering space on a display screen;
   a user interface controller configured to facilitate a user to select a 2D graphical drawing tool via an interface displayed on the display screen;
   a 2D drawing structure generator configured to create a 2D structure in the rendering space based on a drawing made by the user via interaction on the display screen using the selected 2D drawing tool;
   a 3D structure generator configured for computing a 3D structure based on a projection of the 2D structure to the 3D volumetric data;
   a 3D data manipulation mechanism configured to manipulating the 3D volumetric data to produce updated 3D volumetric data based on the 3D structure that serves as a constraint of the manipulation; and
   a display mechanism configured for displaying the updated volumetric data.

49. The system according to claim 48, wherein the 3D data manipulation mechanism comprises:
   a converter configured to convert 2D points of the 2D structure to corresponding 3D points forming a 3D structure; and
   a 3D operation mechanism configure to perform the 3D operation on the 3D volumetric data with respect to the 3D structure.

50. The system according to claim 49, wherein the converter comprises:
   an 3D vector constructor configured to construct a 3D vector based on each of the 2D points, wherein the 3D vector is originated from the 2D point and points in a pre-defined direction;
   a transformation mechanism configured to identify a corresponding 3D point with respect to each of the 2D points based on a 3D vector constructed from the 2D point; and
   a 3D structure generator configure to create the 3D structure based on the corresponding 3D points transformed from the 2D points.

51. The system according to claim 50, wherein the transformation mechanism includes at least one of:
   a ray tracing mechanism configured to identify a corresponding 3D point through a tracing operation initiated from a 2D point in the direction of the 3D vector constructed with respect to the 2D point; and
   a 3D point determiner configured to identify the corresponding 3D point by analytically solve for an intersection point between a shooting ray and a 3D plane, wherein the shooting ray is initiated from the 2D point in the direction of the 3D vector.

* * * * *